F. J. SPRING.
SWIVEL KNOB SPINDLE.
APPLICATION FILED NOV. 29, 1911.

1,015,765.

Patented Jan. 23, 1912.

Frank J. Spring
Inventor

UNITED STATES PATENT OFFICE.

FRANK J. SPRING, OF READING, PENNSYLVANIA, ASSIGNOR TO READING HARDWARE COMPANY, OF READING, PENNSYLVANIA, A CORPORATION OF PENNSYLVANIA.

SWIVEL-KNOB SPINDLE.

1,015,765.   Specification of Letters Patent.   Patented Jan. 23, 1912.

Application filed November 29, 1911. Serial No. 662,992.

*To all whom it may concern:*

Be it known that I, FRANK J. SPRING, citizen of the United States, residing at Reading, in the county of Berks and State of Pennsylvania, have invented certain new and useful Improvements in Swivel-Knob Spindles, of which the following is a specification.

This invention relates to improvements in swivel spindles for door knobs and the object in the present instance is to provide a spindle of the swivel construction and in which provision is made for engaging a roll back whose opening is greater than the opening in the knob, that is, a spindle of more than one diameter, with means for making the spindle members interchangeable. In spindles of this class, that is, of the two-piece construction, it is sometimes desirable to have the connecting screw in one member and sometimes in the other. In the present instance, the two spindle members are identical in form and construction, and each is provided with means for securing the connecting screw therein, so that it will not turn in the member in which it is secured. In this construction the securing screw may be secured in the end which will most conveniently accommodate it, and it may be readily reversed on occasion.

The invention is more fully described in the following specification and clearly illustrated in the accompanying drawing, in which:—

Figure 1:
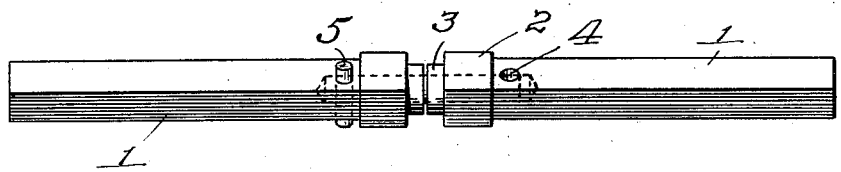
Figure 2:
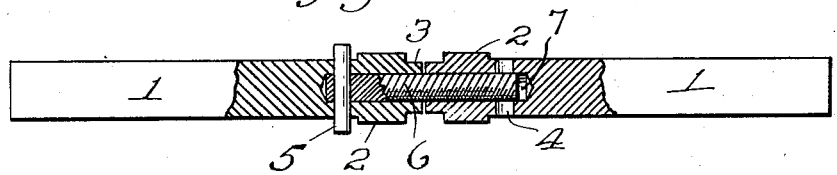
Figure 3:
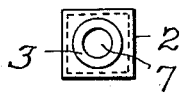

Figure 1 is a side elevation of the spindle. Fig. 2 is an elevation, partly in section. Fig. 3 is a front view of the headed end of one of the spindle members.

The numeral 1 designates the spindle members, of which there are two, and which are identical. Each member is formed with an enlarged portion 2, in close proximity to the inner or meeting end, and the inner extremity, beyond the enlarged portion, is cylindrical in form and slightly reduced in diameter, as shown at 3. Each of the members 1 is formed with a transverse opening 4 immediately behind the enlargement 2, for the purpose of accommodating a pin 5, and each member is also formed with a longitudinal, internally screw-threaded opening 7 in its inner end, in which the connecting screw 6 is inserted. This screw 6 is formed at one end with an opening to accommodate the pin 5 when the said opening registers with either of the openings 4 in the spindle member. The screw is entered in one of the members until it is seated therein, when the opening therein will register with the opening 4, and the pin 5 is placed in position in said registered openings, securely locking the screw in the member against turning therein. The opposite member is then screwed onto the projecting end of the screw, thus forming a complete spindle of the swivel form. In this construction, the enlarged portion 2 of the spindle members is formed by upsetting the metal at the inner end, thus forming a substantial and permanent enlarged portion to accommodate a roll back that will require a greater diameter than that required by the knob, which engages the outer end of the member.

Having thus fully described the invention, what I claim and desire to secure by Letters Patent is:—

1. In a knob spindle, two identical spindle members each of which is formed with an enlarged, rectangular portion near its inner end, a reduced cylindrical portion at its inner extremity, a longitudinal, screw-threaded opening in said inner end, and a transverse pin aperture, a removable pin for said aperture, a removable and interchangeable screw-threaded body adapted to be secured in either of said members by means of said pin and arranged to connect said spindle members in line.

2. A swivel knob spindle comprising two like members of rectangular cross-section, a removable and interchangeable screw arranged to connect said members in line, a pin to secure said screw in either one of the members against turning independently thereof, an enlarged rectangular portion formed integrally on each member near its inner or meeting end, the inner extremity of each member being reduced in diameter and cylindrical in form.

In testimony whereof I affix my signature in presence of two witnesses.

FRANK J. SPRING.

Witnesses:
CLARA E. YOUNG,
ED. A. KELLY.

Copies of this patent may be obtained for five cents each, by addressing the "Commissioner of Patents, Washington, D. C."